(12) United States Patent
Nakamura et al.

(10) Patent No.: US 6,751,692 B1
(45) Date of Patent: Jun. 15, 2004

(54) ADAPTER FOR MEMORY DEVICE AND CONNECTING METHOD USING THE SAME

(75) Inventors: Masahiro Nakamura, Hyogo (JP); Hiroshi Sakurai, Osaka (JP); Takaharu Yoshida, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 348 days.

(21) Appl. No.: 09/627,072

(22) Filed: Jul. 27, 2000

(30) Foreign Application Priority Data

| Jul. 28, 1999 | (JP) | 11-213283 |
| Oct. 4, 1999 | (JP) | 11-282748 |
| Jan. 26, 2000 | (JP) | 2000-016748 |

(51) Int. Cl.⁷ .......................................... G06F 13/00
(52) U.S. Cl. .................... 710/100; 710/8; 710/305; 710/310; 710/315; 711/100; 711/157
(58) Field of Search ................. 710/100, 305, 710/315, 310, 301, 8; 340/825–825.98; 703/23; 711/113, 157, 100; 439/140, 638; 365/226; 257/679

(56) References Cited

U.S. PATENT DOCUMENTS

| 5,430,847 A | * | 7/1995 | Bradley et al. | 710/310 |
| 5,604,890 A | * | 2/1997 | Miller | 439/140 |
| 5,680,579 A | * | 10/1997 | Young et al. | 711/157 |
| 5,706,239 A | * | 1/1998 | Brys | 365/226 |
| 5,731,629 A | * | 3/1998 | Woodward | 257/679 |
| 5,928,347 A | * | 7/1999 | Jones | 710/305 |
| 6,102,715 A | * | 8/2000 | Centofante | 703/23 |
| 6,145,046 A | * | 11/2000 | Jones | 710/301 |
| 6,203,378 B1 | * | 3/2001 | Shobara et al. | 711/115 |
| 6,378,015 B1 | * | 4/2002 | Yen | 439/638 |
| 6,385,667 B1 | * | 5/2002 | Estakhri et al. | 710/8 |
| 6,442,625 B1 | * | 8/2002 | Robinson et al. | 710/8 |

OTHER PUBLICATIONS

IBM, IBM Microdrive, 6/99, http://ssdweb01.storage.ibm.com/hdd/micro/brochure/brochure.html.*
MicroTech, CompactFlash Adapter, 6/98, http://www.imcrotechint.com/qa–cfa.html.*
DriverZone, Technical Bulletin 3331, 6/97, http://www.driverzone.com/drivers/syquest/faqs/tb3331.txt.*
PCGuide, The 65536 Cylinder Barrier, http://www.pcguide.com/ref/hdd/bios/sizeGB315–c.htm.*
Andrew Tanenbaum, Structured Computer Organization, 1990, Prentice–HAll Inc., 3rd Ed., 11–13.*
TechEncyclopedia, definition for "Driver", http://www.techweb.com/encyclopedia/defineterm?term=Driver.*

\* cited by examiner

*Primary Examiner*—Gopal C. Ray
*Assistant Examiner*—Justin King
(74) *Attorney, Agent, or Firm*—Wenderoth, Lind & Ponack, L.L.P.

(57) ABSTRACT

An adapter for a memory device for connecting a detachable memory device to an AT attachment (ATA) interface of a host computer and a connecting method using the adapter are presented. With a conventional adapter which is not supplied with a number of heads and a number of sectors per track of the memory device in advance, the actual numbers of the memory area of the memory device may be different from those supplied the adapter for a memory device. This prevents the memory device from being normally accessed in a cylinder head sector (CHS) mode by the adapter. The adapter for a memory device according to the present invention identifies a file format of data stored in the memory area in the memory device, and retrieves and saves data about the number of heads and the number of sectors per track. Even if the adapter is not previously supplied with the number of heads and the number of sectors per track of the memory device, it accordingly allows the memory device to be accessed in the CHS mode.

4 Claims, 13 Drawing Sheets

FIG. 9

| Offset | Bytes | Contents |
|---|---|---|
| 00h | 3 | ID (Jump Command to Boot Code) (E8h, xxh, 90h) or (E9h, xxh, xxh) |
| 03h | 8 | Manufacturer and Version No. |
| 08h | 2 | Number of Bytes per Sector    (BPB Starts from Here) |
| 0Dh | 1 | Number of Clusters per Sector |
| 0Eh | 2 | Number of Reserved Sectors |
| 10h | 1 | Number of File Allocation Tables (FATs) |
| 11h | 2 | Number of Entry in Root Directory |
| 13h | 2 | Total Number of Sectors (If >2 Bytes, then 0) |
| 15h | 1 | Media Descriptor (F8h) |
| 16h | 2 | Number of Sectors per FAT    (BPB Ends Here) |
| 18h | 2 | Number of Sectors per Track |
| 1Ah | 2 | Number of Heads |
| 1Ch | 4 | Number of Hidden Sectors |
| 20h | 4 | Total Number of Sectors (Valid When Offset 13h = 0) |
| 24h | 1 | Drive No. (80h) |
| 25h | 1 | (Reserved) |
| 26h | 1 | Extended Boot Signature (29h) |
| 27h | 4 | Volume ID No. (Volume Serial No.) |
| 28h | 11 | Volume Label |
| 36h | 8 | File System Type (ASCII Characters + Space(20h)) FAT12 : 12 Bit FAT FAT16 : 16 Bit FAT |

FIG. 10

| Word Address | Bytes | Contents |
|---|---|---|
| 0 | 2 | Number of Bits of General Configuration |
| 1 | 2 | Number of Cylinders |
| 2 | 2 | (Reserved) |
| 3 | 2 | Number of Heads |
| 4 | 2 | Number of Unformatted Bytes per Track |
| 5 | 2 | Number of Unformatted Bytes per Sector |
| 6 | 2 | Number of Sectors per Track |
| 7 – 8 | 4 | Number of Sectors per Card |
| 9 | 2 | Vender Unique |
| 10 – 19 | 20 | Serial No. |
| 20 | 2 | Buffer Type |
| 21 | 2 | Buffer Size in Units of 512 Bytes |
| 22 | 2 | Number of ECC Bytes for Passing Read/Write Long Command |
| 23 – 26 | 8 | Number of Firmware Versions |
| 27 – 46 | 40 | Model No. |
| 47 | 2 | Max. Number of Sectors transferred upon interruption with Read/Write Multiple Command |
| 48 | 2 | Non Supportable to Double Word (32 Bits) |
| 49 | 2 | LBA Support and DMA Transfer Capability |
| 50 | 2 | (Reserved) |
| 51 | 2 | PIO Data Transfer Timing |
| 52 | 2 | DMA Data Transfer Timing |
| 53 | 2 | Valid Data in Word Addresses 54 – 58<br>Invalid Data in Word Addresses 64 – 70 |
| 54 | 2 | Number of Current Cylinders (A) |
| 55 | 2 | Number of Current Heads (B) |
| 56 | 2 | Number of Current Sectors per Track (C) |
| 57 – 58 | 4 | Total Number of Current Sectors for CHS Mode (A)*(B)*(C) |
| 59 | 2 | Invalid Option Set for Transferring Multiple Sector |
| 60 – 61 | 4 | Total Number of Sectors for LBA Mode |
| 62 – 127 | 132 | (Reserved) |
| 128 – 159 | 64 | Vender Unique |
| 160 – 255 | 192 | (Reserved) |

FIG. 12A

```
SE1 = Total Number of Sectors
HD = Number of Heads
SE2 = Number of Sectors per Track
CY = Number of Cylinders
```

Start
↓
SE1 ← Memory Capacity(Byte) / 512
↓
Factorize SE1 into Prime Factors
SE1 = a(1)*a(2)*..*a(x)*..*a(n)
a(1) ≤ a(2) ≤ .. ≤ a(x) ≤ .. ≤ a(n)   — S40
↓ S41
CurrentHead ← 1,  x ← 1
SectorPerTrack ← 1
↓
CurrentHead * a(x) > 16 ?   — S42, S43
 — No → CurrentHead ← CurrentHead * a(x)   — S50
        ↓
        x ← x + 1   — S51
        ↓
        x > n ?   — S52
        No → (loop back)
        Yes → ↓
 — Yes ↓
SectorPerTrack * a(x) > 255 ?   — S44, S60
 — Yes → (to S55)
 — No ↓
SectorPerTrack ← SectorPerTrack * a(x)   — S45
↓
SE1 / (CurrentHead * SectorPerTrack) ≤ 65535 ?   — S46
 — Yes → A
 — No ↓
x ← x + 1   — S53
↓
x < n ?   — S54
 Yes → (loop)
 No ↓
                    SE1 / (CurrentHead * SectorPerTrack) ≤ 65535 ?   — S55
                     Yes → B
                     No ↓
SectorPerTrack ← 255   — S56
↓
A        B

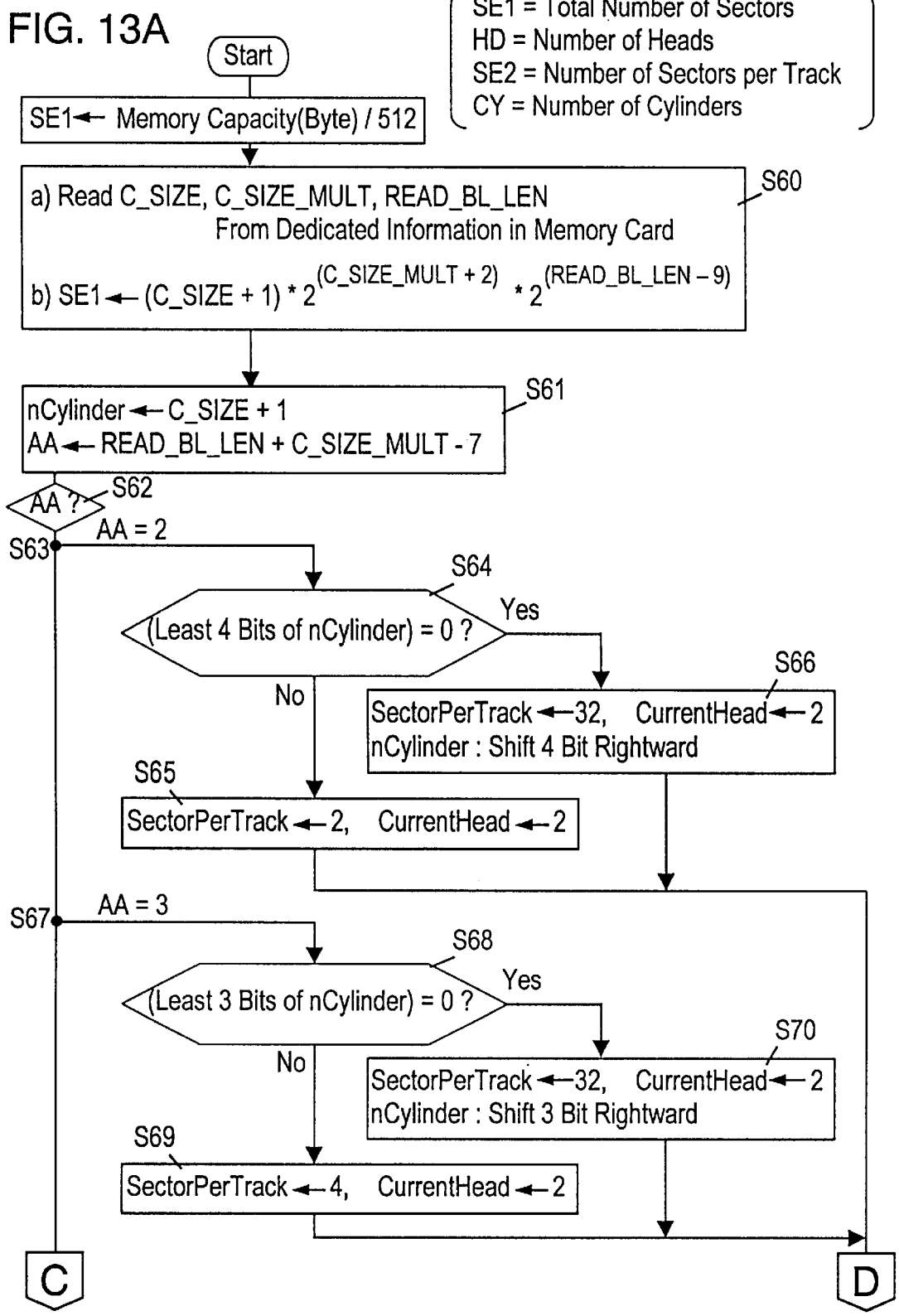

ADAPTER FOR MEMORY DEVICE AND CONNECTING METHOD USING THE SAME

BACKGROUND OF THE INVENTION

1. Field of the Invention

The present invention relates to an adapter for a memory device used in a host computer and particularly to a PC card adapter arranged for detachably connecting a memory device smaller in size than the PC card to the PC card ATA interface of a host computer.

2. Description of the Related Art

A variety of portable apparatuses have rapidly prevailed throughout the market. Those portable apparatuses are commonly accompanied with a detachable external memory device for exchanging data with other apparatuses. A representative external memory device is a PC card. The PC cards are generally installed in personal computers, digital cameras, personal digital assistants (PDA), and hand-held terminals. Digital cameras commonly accompany small memory devices such as smart media cards, which can not conform to the ATA interface, for storage of image data. A PC card adapter is used for connecting the PC card to the ATA interface and allowing a personal computer to read and write image data on the memory device. Such a PC card adapter is illustrated below as a typical adapter for a memory device.

The PC card ATA interface is commonly used as the interface to a PC card. The ATA interface has two modes used for accessing the memory area: a logical block access (LBA) mode for allocating sector numbers to the memory area from the top to be accessed; and a cylinder head sector (CHS) mode for reading and writing data by pointing to the location determined by a cylinder, a head, and a sector. It is also essential for the reading and writing of data in the CHS mode to specify the number of heads (the maximum of the applicable head number plus one) and the number of sectors per track (the maximum of the sector number to be specified).

A conventional PC card adapter is pre-arranged to accommodate such a size of memory capacity that the number of heads specified by the PC card adapter is equal to the number of heads needed for reading and writing data on the memory area of a memory device in the CHS mode. Simultaneously, the numbers of sectors per track specified by the PC card adapter is equal to the number of sectors per track needed for reading and writing data in the CHS mode. This allows a host computer to selectively use either the number of heads and the number of sectors per track specified by the PC card adapter or those in the memory area of the memory device. In each case, the number of heads and the number of sectors per track are equal to the others, hence allowing the host computer to read and write data in the memory device in the CHS mode.

For pre-arranging to match the number of heads and the number of sectors per track, the number of heads and the number of sectors per track depending on the memory capacity are stored in the form of a table in a ROM.

However, if not pre-arranged to match the number of heads and the number of sectors per track with the memory device, the number of heads and the number of sectors per track specified by the conventional PC card adapter may be different from those stored in the memory area of the memory device. If different, a known adapter for a memory device such as the conventional PC card adapter is prevented from normally accessing the memory device in the CHS mode.

When loaded with a newly introduced memory device which is unique in the number of heads and the number of sectors per track, the conventional adapter for a memory device is not compatible and it is difficult to access the memory device in the CHS mode.

The number of combinations of the number of heads and the number of sectors per track stored in the form of a table in the ROM is dependent on the memory capacity. When being compatible to various types of memories, an adapter needs a large table, thus requiring a large capacity ROM.

SUMMARY OF THE INVENTION

This invention provides an adapter for a memory device which can access the memory device in the CHS mode when being incompatible in the number of heads and the number of sectors with the memory device and a connecting method using the same.

The adapter for a memory device according to the present invention arranged for connecting the memory device having a memory area the ATA interface of a host computer comprises:

(a) a first connector for connecting to the memory device;

(b) a second connector for connecting to the ATA interface of the host computer;

(c) a memory device accessing means for reading and writing data on the memory area of the memory device;

(d) an ATA interface controller for exchanging data with the host computer through the ATA interface of the host computer; and (e) a file format identifying means for identifying the file format of data stored in the memory area of the memory device, the file format identifying means comprising (e-1) a means for identifying the type of the file format from a file format data stored in the memory device and (e-2) a means for retrieving and saving the number of heads and the number of sectors per track.

The number of heads and the number of sectors per track specified by the adapter for a memory device can accordingly be equal to those in the memory area of the memory device. The problem with a conventional adapter being that the action of accessing is hardly executed in the CHS mode can be solved with the adapter of the present invention. The adapter of the present invention can access, in the CHS mode, the memory device with a newly-provided number of heads and a newly-provided number of sectors per track.

Another adapter for a memory device according to the present invention comprises:

(a) a first connector for connecting the adaptor to the memory device;

(b) a second connector for connecting the adaptor to the ATA interface of the host computer;

(c) a memory device accessing means for reading and writing data on the memory area of the memory device;

(d) an ATA interface controller for exchanging data with the host computer through the ATA interface of the host computer; and (e) a file format detecting means for examining whether or not the data stored in the memory area of the memory device includes a file format data, the file format detecting means comprising (e-1) a means for calculating and holding the number of heads and the number of sectors per track when it is possible to retrieve both the number of heads and the number of sectors per track from the data stored in the memory area of the memory device. Consequently, even if the memory area of the memory device fails to accommodate the number of heads and the number of sectors per track in the adapter, it can successfully be accessed in the CHS mode. Also, it is unnecessary to hold the data about the number of heads and the number of sectors per track in the form of a table in the ROM depending on the memory capacity and the size of the ROM can thus be minimized.

The present invention is equally applicable to a PC card adapter which conforms to the PC card ATA interface standard.

BRIEF DESCRIPTION OF THE DRAWINGS

FIG. 9 illustrates a structure of a boot sector;

FIG. 10 illustrates content of Identify Drive data in a PC card;

FIGS. 12A and 12B illustrates another flowchart for calculating the number of heads and the number of sectors per track; and FIGS. 13A, 13B, and 13C illustrates a further flowchart for calculating the number of heads and the number of sectors per track.

DETAILED DESCRIPTION OF THE PREFERRED EMBODIMENTS

Embodiments of the present invention will be described referring to the relevant drawings. The embodiment of the present invention is illustrated in the form of an adapter for a memory device which is arranged for:

(1) using a smart media card which is smaller in size than a PC card as the memory device;

(2) detachably connecting to the PC card ATA interface; and (3) exchanging data with a host computer such as a notebook computer.

Embodiment

Figure 1:
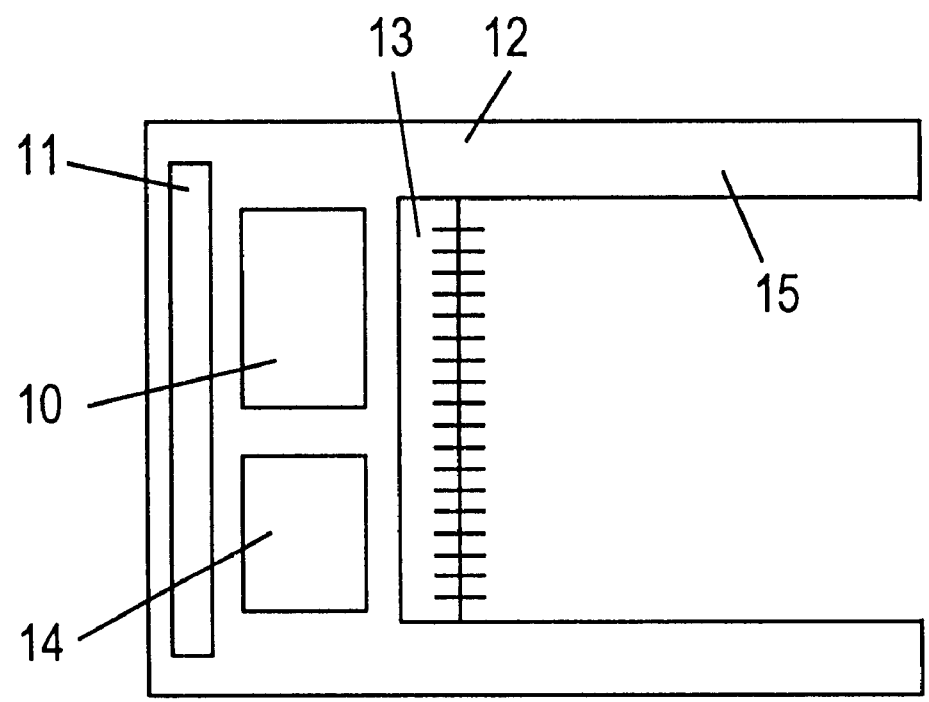
FIG. 1 illustrates an arrangement of primary components of a PC card adapter.

FIG. 1 illustrates a PC card adapter of Embodiment 1. As shown in FIG. 1, the PC card adapter 12 comprises a connector 11 of an ATA interface to a host computer, a connector 13 for connecting the PC card adapter to a memory device, a guide 15 for assisting in the connection between the PC card and the memory device, a controller IC 10, and a peripheral circuit 14 for operating the controller IC 10. The controller IC 10 controls the memory device connected to the connector 13, the host computer connected to the connector 11, and the ATA interface.

Figure 2:
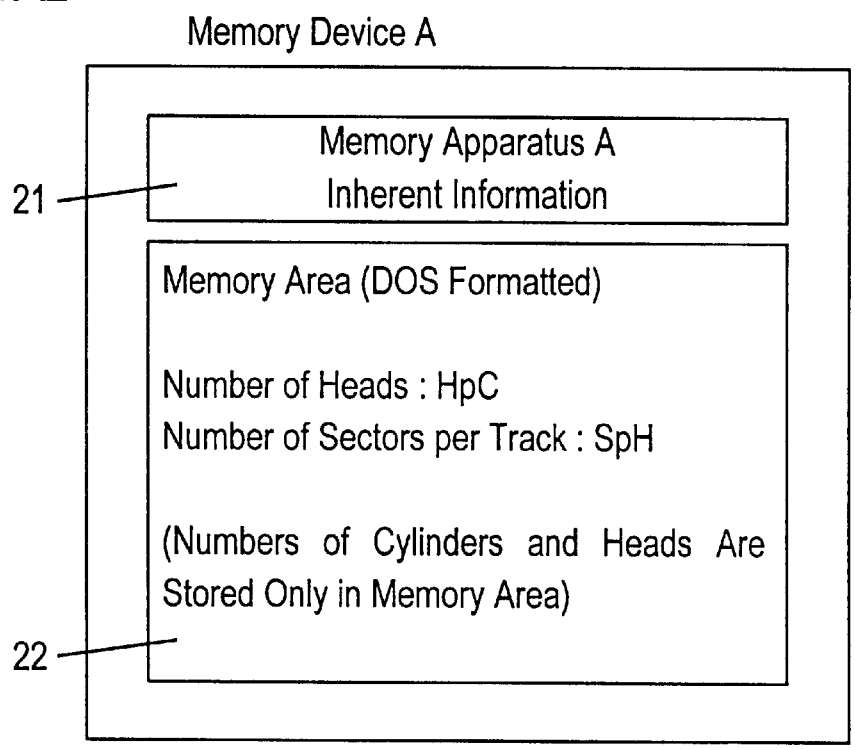
FIG. 2 illustrates a memory device A having a memory area formatted in a specific system.

FIG. 2 illustrates a memory device A in Embodiment 1. Memory device A has a dedicated information area 21 storing characteristic information of the card such as memory capacity but not storing information about the number of heads and the number of sectors per track for access in the CHS mode. Memory area 22 of memory device A is an area on which data can be written and read by the host computer and is formatted for a given system, for example, the DOS system, and carries the number of heads and the number of sectors per track.

Figure 4:
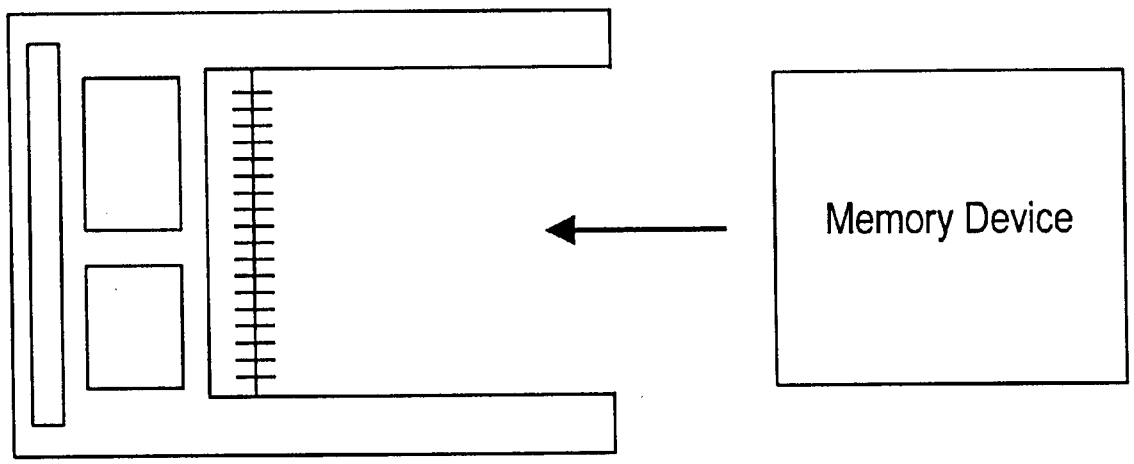
FIG. 4 illustrates a PC card adapter without a memory device loaded.

FIG. 4 illustrates the PC card adapter before it is loaded with the memory device.

Figure 5:
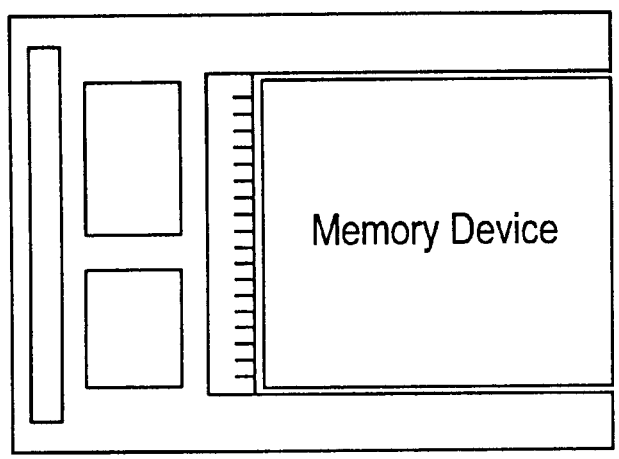
FIG. 5 illustrates the PC card adapter with a memory device loaded.

FIG. 5 illustrates the PC card adapter loaded with the memory device.

Figure 7:
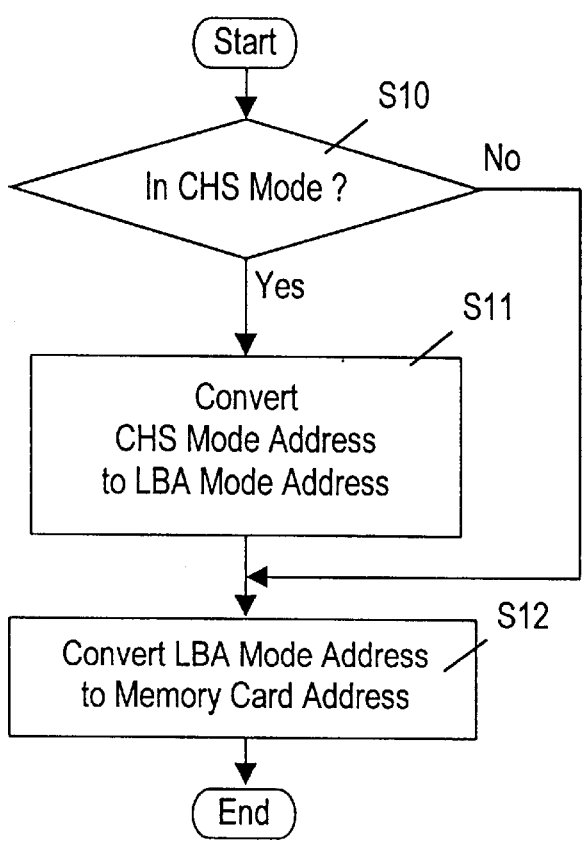
FIG. 7 is a flowchart illustrating an exchange of address data between the PC card adapter and the memory device.

FIG. 7 is a flowchart showing a procedure in the PC card adapter when the host computer accesses the PC card in the CHS mode and the LBA mode.

Figure 8:
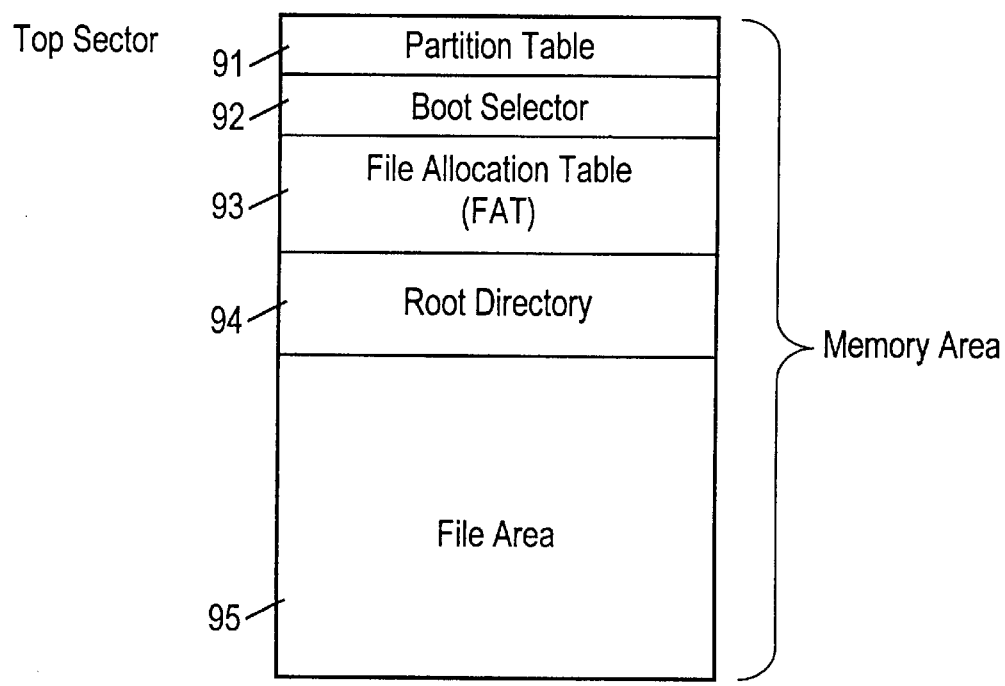
FIG. 8 illustrates data assignment in the memory area of the memory device formatted in a DOS system.

FIG. 8 is a diagram showing the allocation of data in the memory area of the memory device which is formatted in the DOS system. Partition table 91 contains data indicative of the location of a boot sector 92 and is used for identifying the content of the boot sector 92. The memory area also includes a file allocation table (FAT) 93, a root directory 94 having a hierarchical structure, and a file area 95 in which files are stored.

FIG. 9 illustrates a structure of the boot sector 92. The boot sector 92 contains various parameters for allowing access to the memory area. The number of sectors per pack is held in the position of offset 18h while the number of heads is held in the exposition of offset 1Ah. More specifically in the DOS format, the boot sector 92 contains data about the number of heads and the number of sectors per track.

FIG. 10 illustrates a data of 512 bytes to be read out when the PC card receives an IdentifyDrive command from the host computer. The number of sectors per track is held in the position of offsets 6 and 56 while the number of heads is held in the position of offsets 3 and 55. The memory capacity is held in the position of offset 57.

A program in the controller IC 10 for the PC card adapter is now explained referring to the flowchart shown in FIG. 2.

It is assumed that the PC card adapted of the present invention accepts memory device A shown in FIG. 2.

At step S1, memory device A is loaded into the PC card adapter of the present invention. Then step S2 follows where the PC card adapter is connected to the ATA interface of the host computer.

At step S3, the memory capacity of memory device A is read via memory device accessing means by file format identifying means.

At step S4, the memory area 22 of memory device A is accessed by the file format identifying means to examine whether a specific format is applied or not. Since the memory area 22 of memory device A accommodates a specific format, the DOS format, as shown in FIGS. 9 and 10, the procedure goes to step S5.

At step S5, it is examined whether or not the specific format, the DOS format, in the memory area 22 of memory device A saves the number of heads and the number of sectors per track. As the memory area 22 holds the number of heads and the number of sectors per track, the procedure advances to Step S7.

At Step S7, the PC card adapter reads and holds the number of heads and the number of sectors per track stored in memory area 22 of memory device A. These data are transferred via the ATA interface to the host computer. Thereafter, when the host computer starts accessing in the CHS mode, the controller IC 10 uses the data about the number of heads and the number of sectors per track to convert the address in the CHS mode to the address in the LBA mode. Then, the controller IC 10 converts the address in the LBA mode to a logic address in the memory device A by the manner illustrated in the flowchart of FIG. 7, thus enabling the accessing of the memory device A.

The conversion between the LBA mode address and the CHS mode includes:

(1) converting the CHS mode address to the LBA mode address as expressed by $$LBA=(C*HpC+H)*SpH+S-1; \text{ and} \qquad (1)$$

(2) converting the LBA mode address to the CHS mode address as expressed by $$C=LBA/(HpC*SpH) \qquad (2)$$

$$H=(LBA/SpH) \bmod HpC \qquad (3)$$

$$S=(LBA \bmod SpH)+1 \qquad (4)$$

where C is the cylinder number, H is the head number, S is the sector number, HpC is the number of heads, and SpH is the number of sectors per track.

As described in above, the number of heads specified by the PC card adapter becomes equal to that in the memory area of memory device A while the number of sectors per track specified by the PC card adapter becomes equal to that in the memory area of memory device A, thus normally enabling access to the memory device A in the CHS mode. Accordingly, even if another type of memory device A is newly developed which is unique in the number of heads and the number of sectors per track, it can be loaded into the PC card adapter even after the PC card adapter has been placed in the market, and can be normally accessed.

Embodiment 2

FIG. illustrates a memory device B of Embodiment 2. A dedicated information area 31 of memory device B holds card specific data such as memory capacity, but not data about the number of heads and the number of sectors per track which are needed for accessing in the CHS mode. Memory area 32 is a storage area on which data can be written and read by the host computer, it is not formatted in a particular system, for example the DOS system, and holds no data about the number of heads and the number of sectors per track.

Figure 3:
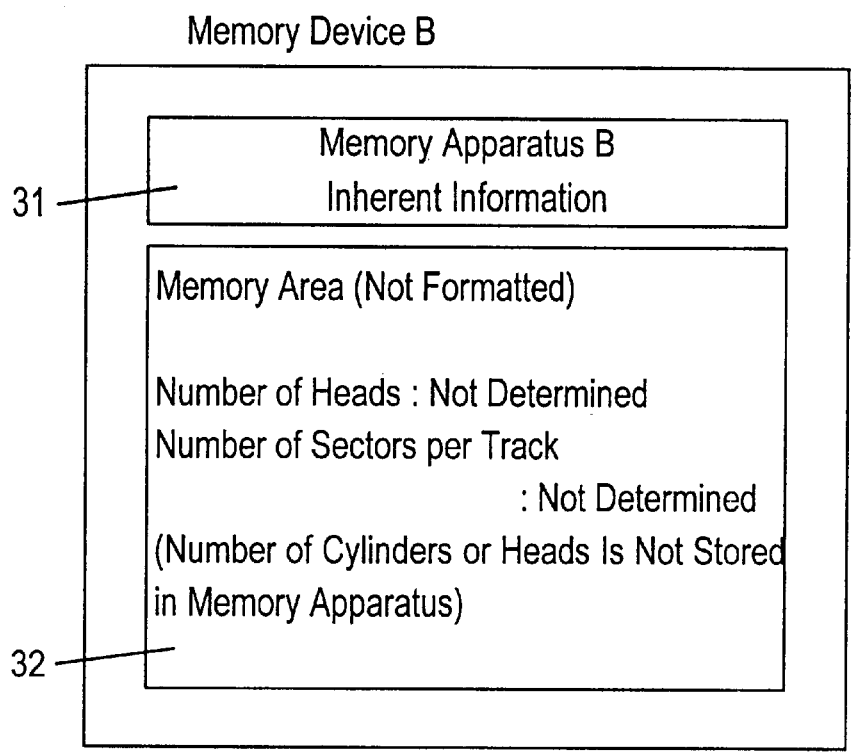
FIG. 3 illustrates a memory device B having a memory area not formatted.

Memory device B, shown in FIG. 3, is substantially identical to memory device A of Embodiment 1, shown in FIG. 2, except that the memory area is not formatted in a specific system.

A procedure of actions when memory device B is loaded into the PC card adapter will now be explained.

Figure 6:
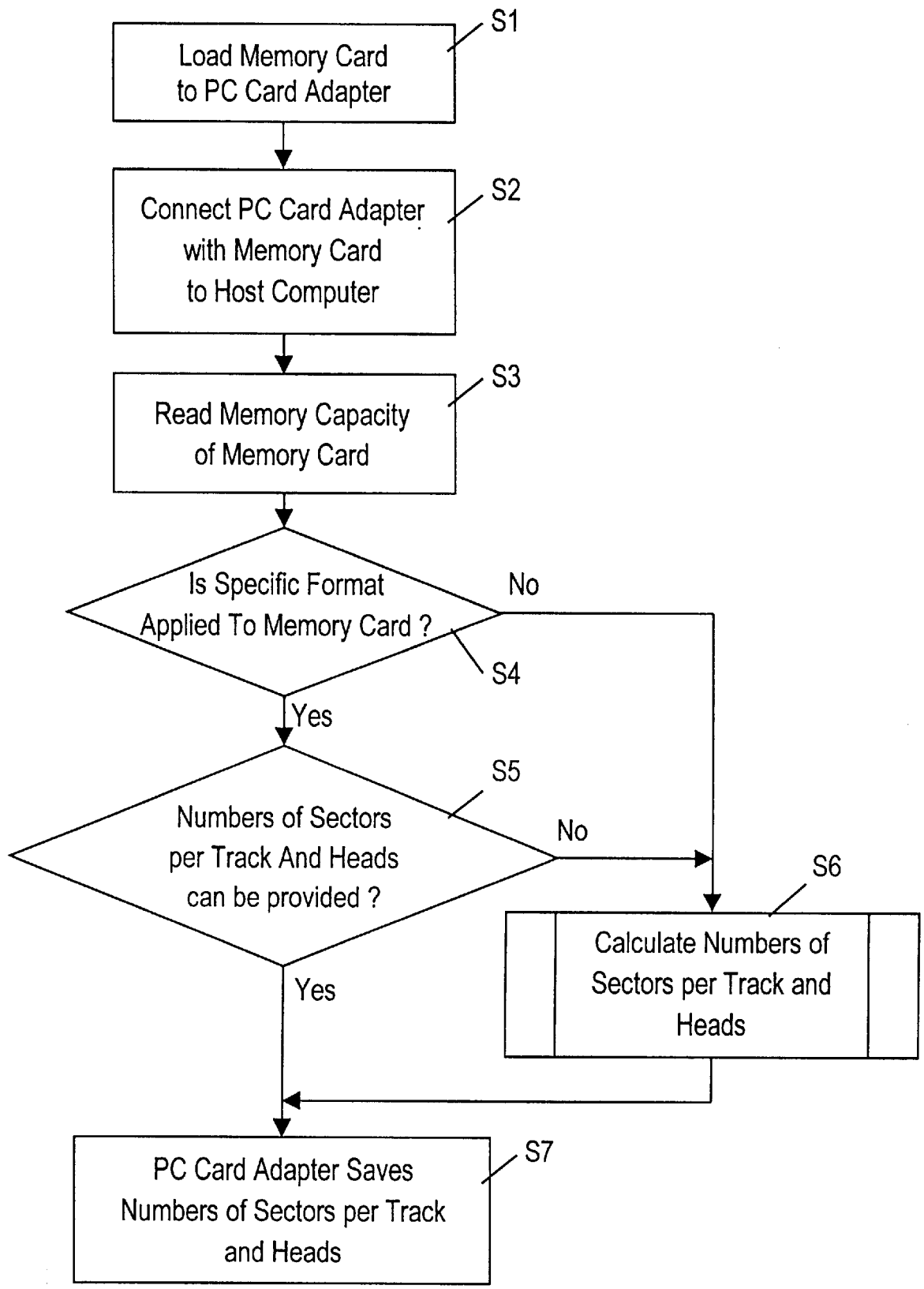
FIG. 6 is a flowchart illustrating connection of connecting the adapter for a memory device.

As shown in FIG. 6, the procedure starts with Step S1 where the memory device B is loaded into the PC card adapter of the present invention. At Step S2, the PC card adapter is connected to the ATA interface of a host computer.

Then at Step S3, memory capacity of memory device B is read via memory device accessing means by file format detecting means.

At Step S4, the memory area 32 of memory device B is accessed by the file format detecting means to examine whether or not it is formatted in a specific system. Since the memory area 32 of memory device B is not formatted in a specific system, for example the DOS system, the procedure goes to Step S6.

At Step S6, the number of heads and the number of sectors per track are calculated so as to favorably correspond to the memory capacity read at Step S3. The calculation at Step S6 is explained below referring to FIG. 11.

Figure 11:
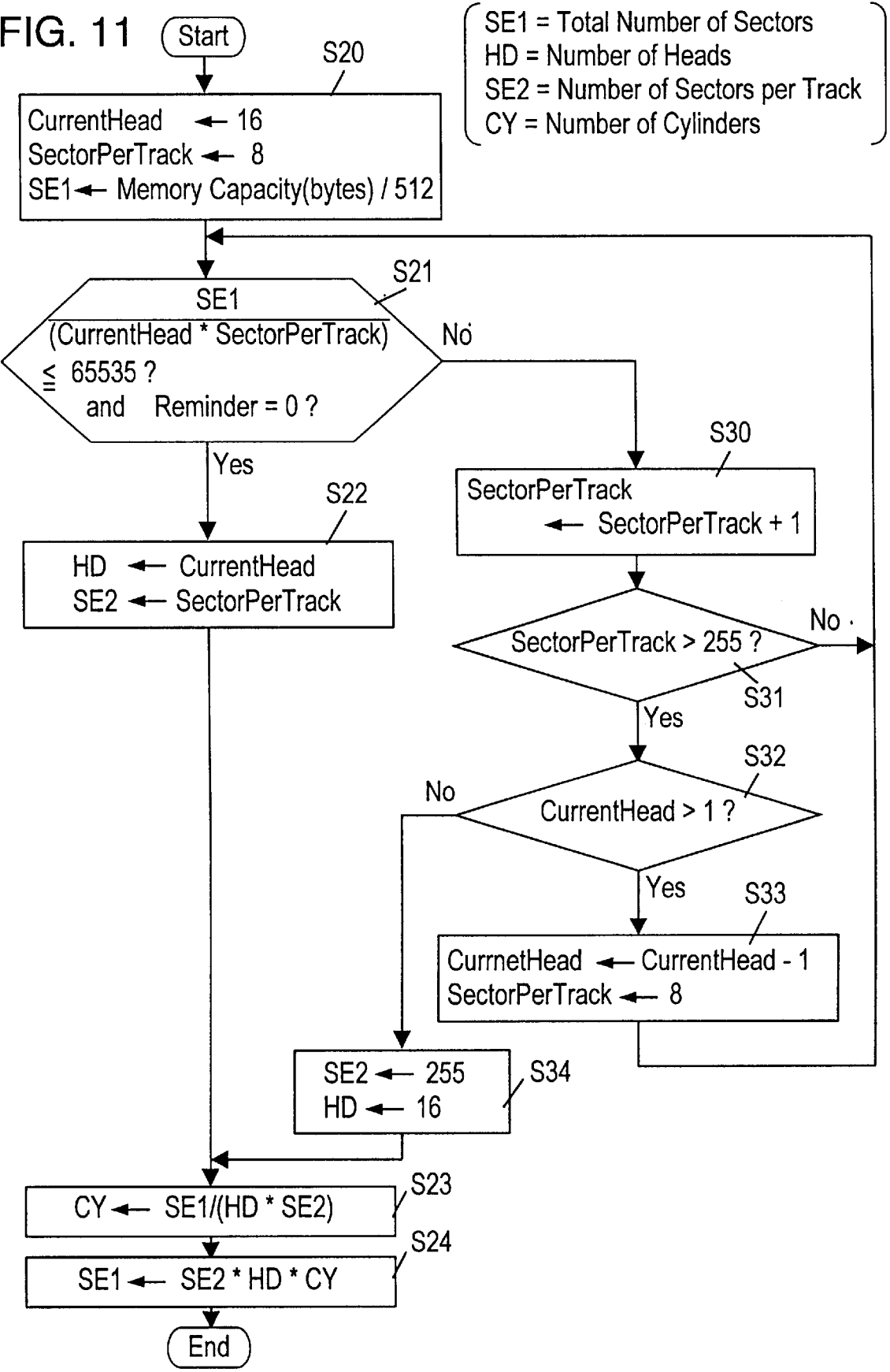
FIG. 11 illustrates a flowchart for calculating a number of heads and a number of sectors per track.

As shown in FIG. 11, two variables CurrentHead and SectorPerTrack are initialized with predetermined values at Step S20. Step S21 then follows where the read memory capacity in bytes is divided by 512 to determine the total number of sectors. The total number of sectors is then divided by the product of the variables CurrentHead and SectorPerTrack. When the resultant quotient is equal to or smaller than 65535 and the remainder is zero, the procedure advances to Step S22 where the two variables CurrentHead and SectorPerTrack are assigned as the number of heads and the number of sectors per track, respectively.

When it is found at Step S21 that the quotient is greater than 65535 or the remainder is not zero, the procedure goes to Step S30 where the two variables CurrentHead and SectorPerTrack are modified and Step S21 is repeated until the variables with the remainder of zero are obtained.

If the two variables CurrentHead and SectorPerTrack causing the remainder to be zero are not obtained at Step S21, the procedure jumps to Step S34 where it is determined that the number of heads is set to 16 and the number of sectors per track is set to 255.

As the number of heads and the number of sectors per track are given, the procedure moves to Step S23 where the total number of sectors is divided by the product of the number of heads and the number of sectors per track, and its resultant quotient, of which the fractions or digits after the decimal point are eliminated, is assigned as the number of cylinders. This is followed by Step S24 where the product of the number of heads, the number of cylinders, and the number of sectors per track is assigned as the total number of sectors for the CHS mode.

Figure 12B:
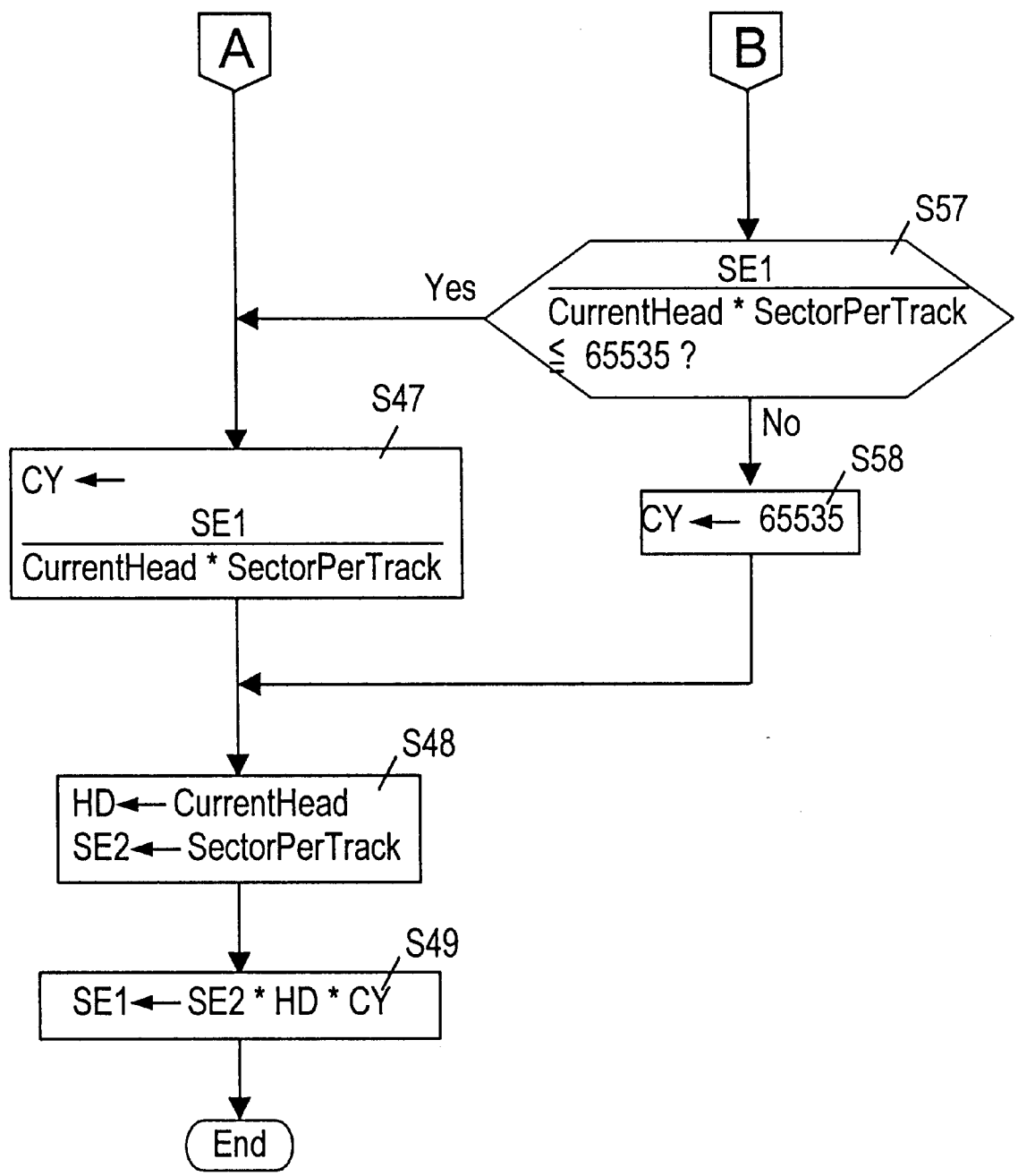

FIGS. 12A and 12B illustrate another procedure of the calculation. At Step S40, the memory capacity in bytes is divided by 512 and its quotient as the total number of sectors is prime factorized. The resultant prime factors are expressed as a(1), a(2), a(3), and so on where the x-the smallest factor is a(x) and the largest factor is a(n). Thus, the total number of sectors is:

a(1)*a(2)*a(3)* . . . *a(x)* . . . *a(n).

This is followed by Step S41 where the variable CurrentHead is initialized to 1, the variable x is initialized to 1, and the variable SectorPerTrack is initialized to 1.

At Step S42, the variable CurrentHead is multiplied by the prime factor a(x) (yielding CurrentHead*a(x)). When it is judged at Step S43 that the product CurrentHead*a(x) is greater than 16, the procedure jumps to Step S44. When the product is not greater than 16, the procedure advances to Step S50.

At Step S50, the variable CurrentHead is substituted with the product CurrentHead*a(x) and the procedure goes to Step S51. At Step S51, x is incremented by 1 and the procedure moves to Step S52. At step S52, when x is equal to or smaller than n, the procedure returns back to Step S42. When x is greater than n, the procedure goes to Step S55.

At Step S44, the variable SectorPerTrack is multiplied by a[x] (yielding SectorPerTrack*a(x)). At Step S60, when SectorPerTrack*a(x) is greater than 255, the procedure jumps to Step S55. When not, the procedure goes to Step S45.

When it is found at Step S55 that the quotient of the total number of sectors divided by the product of the two variables SectorPerTrack and CurrentHead is equal to or smaller than 65535, the procedure goes to Step S47. When not, the procedure moves to Step S56.

At Step S45, the variable SectorPerTrack is substituted with SectorPerTrack*a(x) and the procedure then goes to Step S46.

When it is found at Step S46 that the quotient of the total number of sectors divided by the product of the two variables SectorPerTrack and CurrentHead is equal to or smaller than 65535, the procedure goes to Step S47. When not, the procedure moves to Step S53. At Step S53, x is incremented by 1and the procedure then goes to Step S54. When it is found at Step S54 that x is smaller than n, the procedure returns back to Step S44. When it is found at Step S54 that x is not smaller than n, the procedure goes to Step S56. At Step S56, the variable SectorPerTrack is set to 255 and the procedure goes to Step S57.

When it is found at Step S57 that the quotient of the total number of sectors divided by the product of the two variables SectorPerTrack and CurrentHead is equal to or smaller than 65535, the procedure goes to Step S47. When not, the procedure moves to Step S58.

At Step S58, the number of cylinder is set to 65535 and the procedure then goes to Step S48.

At Step S47, the quotient of the total number of sectors divided by the product of the two variables CurrentHead and SectorPerTrack is rounded by eliminating fractional digits after the decimal point and its resultant value is assigned as the number of cylinders, then the procedure moves to Step S48.

At Step S48, the variables CurrentHead and SectorPerTrack are assigned as the number of heads and the number of sectors per track respectively, and the procedure goes to Step S49. At Step S49, the product of the number of sectors per track, the number of heads, and the number of cylinders is then assigned as the total number of sectors for the CHS mode.

In the calculating methods shown in FIGS. 11, 12A, and 12B, the maximum value of the variable SectorPerTrack can be a hexadecimal number of "FF", then, the maximum value in these embodiments is 255. When importance is attached to the limited value specified in the ATA standards (the number of sectors per track being not greater than 63), the calculation may be corrected to meet the condition that the maximum value is 63.

Figure 13B:
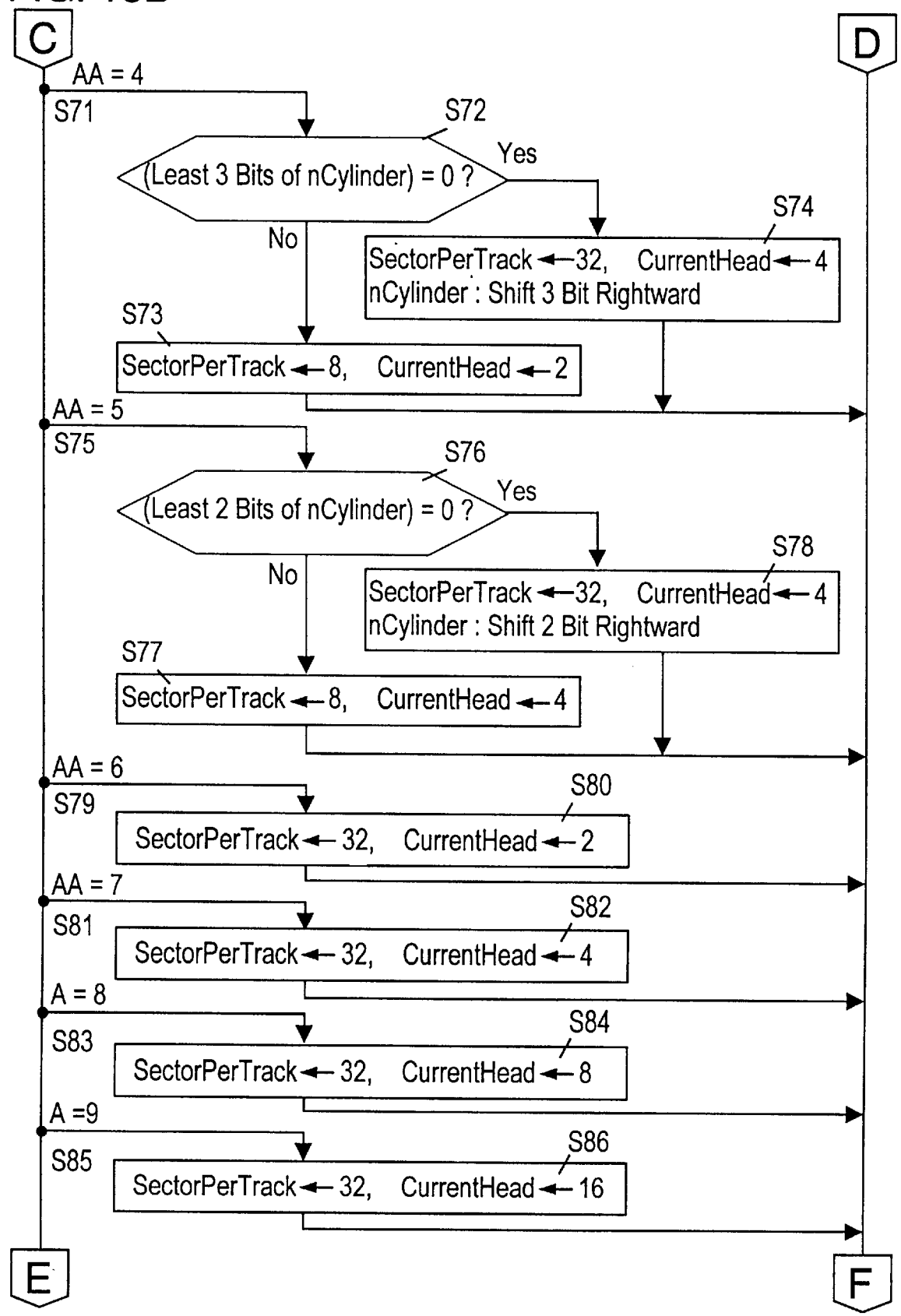
Figure 13C:
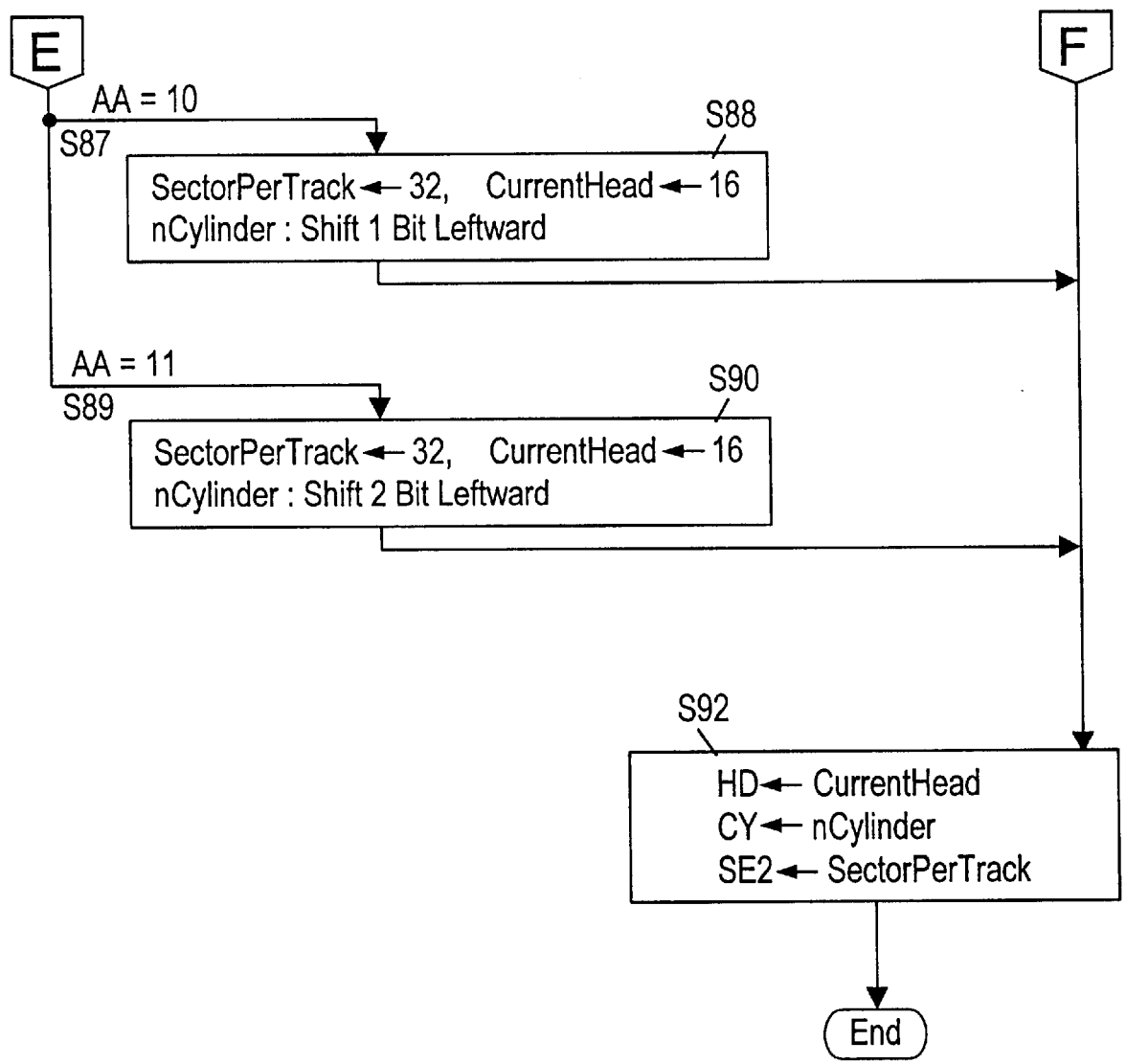

FIGS. 13A, 13B, and 13C illustrate a further procedure of the calculation. At Step S60, the memory device is accessed to read a first dedicated data C_SIZE, a second dedicated data C_SIZE_MULT, and a third dedicated data READ_BL_LEN in dedicated information. The total number of sectors is then calculated from the following equations as assigned for use in the CHS mode.

Memory capacity (in bytes)=$(C\_SIZE+1)*2\char`\^(C\_SIZE\_MULT+2)*2\char`\^(READ\_BL\_LEN)$ Total number of Sectors $(SE1)=(C\_SIZE+1)*2\char`\^(C\_SIZE\_MULT+2)*2\char`\^(READ\_BL\_LEN-9)$ where $0<=C\_SIZE<=4095$, $0<=C\_SIZE\_MULT<=7$, and $9<=READ\_BL\_LEN<=11$.

This is followed by Step S61 where two new variables nCylinder and AA are introduced as followings:

nCylinder=$C\_SIZE+1$; and

AA=READ_BL_LEN+C_SIZE_MULT−7.

The values of 1 and 7 are used in two of the above equations because they are preferable for increasing the efficiency in producing the program. This procedure may be implemented using other values or without any addition or subtraction.

Step S62 then follows and from which the procedure is branched to Steps S63, S67, S71, S75, S79, S81, S83, S85, S87, and S89 in accordance with the variable AA.

When the variable AA is 2, the procedure goes to Step S64. When it is found at Step S64 that the least four bits of the variable nCylinder are zeros, the procedure moves to Step S66. At Step S66, the variables CurrentHead and SectorPerTrack are set to 2 and 32, respectively. Then, a row of bits of the variable nCylinder is shifted by four towards the less significant bits and assigned as new setting of the variable nCylinder. Then, Step S92 follows.

When it is found at Step S64 that the least four bits of the variable nCylinder are not zeros, the procedure goes to Step S65 where the variable CurrentHead is set to 2 and the variable SectorPerTrack is set to 2, then, the procedure advances to Step S92.

When the variable AA is 3, the procedure goes to Step S68. When the least three bits of the variable nCylinder are zeros, the procedure moves to Step S70. At Step S70, the variables CurrentHead and SectorPerTrack are set to 2 and 32, respectively. And then, a row of bits of the variable nCylinder is shifted by three towards the less significant bits and assigned as a new setting of the variable nCylinder. Then, Step S92 follows.

When it is found at Step S68 that the least three bits of the variable nCylinder are not zeros, the procedure goes to Step S69 where the variable CurrentHead is set to 2 and the variable SectorPerTrack is set to 4, then the procedure advances to Step S92.

When the variable AA is 4, the procedure goes to Step S72. When the least three bits of the variable nCylinder are zeros, the procedure moves to Step S74. At Step S74, the variables CurrentHead and SectorPerTrack are set to 4 and 32, respectively. Then, a row of bits of the variable nCylinder is shifted by three towards the less significant bits and assigned as a new setting of the variable nCylinder. Then, Step S92 follows.

When it is found at Step S72 that the least three bits of nCylinder are not zeros, the procedure goes to Step S73 where CurrentHead is set to 2 and SectorPerTrack is set to 8, then the procedure advances to Step S92.

When the variable AA is 5, the procedure goes to Step S76. When the least two bits of nCylinder are zeros, the procedure moves to Step S78. At Step S78, the variables CurrentHead and SectorPerTrack are set to 4 and 32, respectively. Then, a row of bits of the variable nCylinder is shifted by two towards the less significant bits and assigned as a new setting of the variable nCylinder. Then, Step S92 follows.

When it is found at Step S76 that the least two bits of nCylinder are not zeros, the procedure goes to Step S77 where CurrentHead is set to 4 and SectorPerTrack is set to 8, then the procedure advances to Step S92.

When the variable AA is 6, the procedure goes to Step S80. At Step S80, the variables CurrentHead and SectorPer- Track are set to 2 and 32 respectively. Then, the procedure goes to Step S92. When the variable AA is 7, the procedure goes to Step S82. At Step S82, the variables CurrentHead and SectorPerTrack are set to 4 and 32, respectively. Then, the procedure goes to Step S92. When the variable AA is 8, the procedure goes to Step S84. At Step S84, the variables CurrentHead and SectorPerTrack are set to 8 and 32, respectively. Then, the procedure goes to Step S92. When the variable AA is 9, the procedure goes to Step S86. At Step S86, the variables CurrentHead and SectorPerTrack are set to 16 and 32, respectively. Then, the procedure goes to Step S92.

When the variable AA is 10, the procedure goes to Step S88. At Step S88, the variables CurrentHead and SectorPerTrack are set to 16 and 32, respectively. Then, a row of bits of nCylinder is shifted by one toward a more significant bit with its least significant bit set to zero as assigned as a new setting of the variable nCylinder. Then, the procedure goes to Step S92.

When the variable AA is 11, the procedure goes to Step S90. At Step S90, the variables CurrentHead and SectorPerTrack are set to 16 and 32, respectively. Then, a row of bits of the variable nCylinder is shifted by two toward the more significant bits with its least two bits set to zeros as assigned as a new setting of the variable nCylinder. Then, the procedure goes to Step S92.

Finally at Step S92, the variables CurrentHead, nCylinder, and SectorPerTrack are assigned as the number of heads, the number of cylinders, and the number of sectors per track, respectively, and the procedure is then terminated.

In this procedure, the three variables CurrentHead, nCylinder, and SectorPerTrack are set to specific values at each of Steps S65, S66, S69, S70, S73, S74, S77, S78, S80, S82, S84, S86, S88, and S90. These values may arbitrarily be determined, under the condition that the product of the variables SectorPerTrack, CurrentHead, and nCylinder is equal to the total number of sectors for the CHS mode determined at Step S60 and that the values fall within the range defined by the ATA standards (the number of sectors per track being not greater than 63, the number of heads being not greater than 16, and the number of cylinders being not greater than 65535).

When it is found at Step S68 that the least three bits of the variable nCylinder are zeros, the procedure goes to Step S70. Sandisk's multimedia cards having memory capacities of 4 MB, 8 MB, and 16 MB are formatted in the DOS system before shipment. The two steps S68 and S70 are added for conforming to those cards of which the memory area has the number of sectors per track preset to 32 and the number of heads preset to 2.

When it is found at Step S72 that the least three bits of the variable nCylinder are zeros, the procedure also advances to Step S74. A Sandisk's 32 MB multimedia card is formatted in the DOS system before shipment. The two steps S72 and S74 are added for conforming to that card of which the memory area has the number of sectors per track preset to 32 and the number of heads preset to 4.

In the steps S64 and S76, the least bits are examined. So far, no memory devices require these two steps. The two steps may however be insignificant in the overall circuitry arrangement of the adapter. The application of these steps for allowed access to memory devices in the CHS mode is not strictly obligated, but may depend on the use of possible new types of multimedia cards which will be put in the market in the future.

The number of heads, the number of cylinders, the number of sectors per track, and the total number of sectors for the CHS mode calculated by: the procedures shown in FIGS. 11, 12A–12B, or 13A–13C are stored in their respective areas of IdentifyDriveData shown in FIG. 10. As an IdentifyDrive command is received from a host computer, IndentifyDriveData containing those numbers for the CHS mode are transferred to the host computer.

After the number of heads and the number of sectors per track have been calculated by the three procedures of calculation at Step S6 shown in FIG. 6, the procedure goes to Step S7 where the data are saved in the PC card adapter of the present invention. The data is then supplied to the host computer by the controller IC 10 via an ATA interface controlling means. This allows the host computer to access the memory device B in the CHS mode through converting the CHS mode address to the LBA mode address and the logic address of the LBA mode to the logic address of memory device B with equations (1), (2), (3), and (4).

Accordingly, even if the data about the number of heads and the number of sectors per track are not saved in the memory area of memory device B, the memory device can successfully be accessed in the CHS mode.

In either of the two embodiments, the memory device accessing means, the ATA interface controlling means, the file format identifying means, and the file format detecting means are functions of the controller IC 10. Hence, it is unnecessary to assign the specific actions to the specific means.

The two embodiments are illustrated in conjunction with a multimedia card as the memory device. In a case in which the memory device is a magnetic disk, the present invention is applicable with equal success to a memory device adapter which interfaces between the magnetic disk and a host computer. The present invention is not limited to a PC card adapter, but its advantage can be implemented on a variety of memory device adapters.

According to the embodiments, the memory device is loaded to the PC card adapter at Step S1, and then the two are connected to the ATA interface of a host computer at Step S2, as shown in FIG. 6. The adapter may first be connected to the host computer and then loaded with the memory device, depending on its function and shape.

The file format detecting means functions in an order described according to the present invention. But, the scope of the present invention is not limited to the description and may cover any modified order of the steps of the procedure.

What is claimed is:

1. A method of connecting and accessing a memory device in a cylinder head sector (CHS) mode with an AT attachment (ATA) interface of a host computer using an adapter, said method comprising:

connecting the memory device to the adapter;

connecting the adapter to the ATA interface;

setting a first variable and a second variable to initial values;

dividing a memory capacity (in bytes) of the memory device by 512 to determine a total number of sectors;

dividing the total number of sectors by a product of the first and second variables to determine a resultant quotient;

if the resultant quotient is equal to or less than 65535 and simultaneously has a remainder of zero, assigning the first variable and the second variable as a number of heads and a number of sectors per track, respectively;

if either the resultant quotient is greater than 65535 or the remainder is other than zero, updating the first and second variables and dividing the total number of sectors by a product of the updated first and second variables to determine a new resultant quotient;

if the new resultant quotient is equal to or less than 65535 and simultaneously has a remainder of zero after said updating of the first and second variables, assigning the updated first variable and the updated second variable as the number of heads and the number of the sectors per track, respectively;

if either the new resultant quotient is greater than 65535 or has a remainder other than zero after said updating of the first and second variables, setting the number of heads and the number of tracks to predetermined variables, respectively;

assigning a quotient of the total number of sectors divided by a product of the number of heads and the number of sectors per track as a number of cylinders; and assigning a product of the number of heads, the number of sectors per track, and the number of cylinders as a total number of sectors for accessing the memory device in the CHS mode.

2. A method of connecting and accessing a memory device in a cylinder head sector (CHS) mode with an AT attachment (ATA) interface of a host computer using an adapter, said method comprising:

connecting the memory device to the adapter;

connecting the adapter to the ATA interface;

dividing a memory capacity (in bytes) of the memory device by 512 to determine a quotient as a total number of sectors and prime factorizing the total number of sectors to determine prime factors of the total number of sectors;

setting a first variable, a second variable, and a third variable x to 1;

multiplying the first variable by an xth smallest one of the prime factors to determine a first product;

if the first product is equal to or less than 16, updating the first variable;

if the first product is greater than 16, multiplying the second variable by the xth smallest one of the prime factors to determine a second product;

if the second product is equal to or less than 255, assigning the second product as the second variable;

dividing the total number of sectors by a product of the first variable and the second variable to determine a quotient;

if the quotient is greater than 65535, updating the second variable;

if the quotient is equal to or less than 65535, assigning a quotient of the total number of sectors divided by a product of the first variable and the second variable as a number of cylinders;

assigning the first variable and the second variable as a number of heads and a number of sectors per track, respectively; and assigning a product of the number of heads, the number of sectors per track, and the number of cylinders as a total number of sectors for accessing the memory device in the CHS mode.

3. An adapter operable to execute a method of connecting a memory device to an AT attachment (ATA) interface of a host computer and accessing the memory device in a cylinder head sector (CHS) mode, said method comprising:

setting a first variable and a second variable to initial values;

dividing a memory capacity (in bytes) of the memory device by 512 to determine a total number of sectors;

dividing the total number of sectors by a product of the first variable and the second variable to determine a resultant quotient;

if the resultant quotient is equal to or less than 65535 and simultaneously has a remainder of zero, assigning the first variable and the second variable as a number of heads and a number of sectors per track, respectively;

if either the resultant quotient is greater than 65535 or the remainder is other than zero, updating the first variable and the second variable;

if either the resultant quotient is greater than 65535 or the remainder is other than zero after said updating the first and second variables, setting a number of the heads and a number of the sectors per track to predetermined values, respectively;

assigning a quotient of the total number of sectors divided by a product of the number of heads and the number of sectors per track as a number of cylinders; and assigning a product of the number of heads, the number of sectors per track, and the number of cylinders as a total number of sectors for accessing the memory device in the CHS mode.

4. An adapter for connecting a memory device to an AT attachment (ATA) interface of a host computer and accessing the memory device in a cylinder head sector (CHS) mode, said adapter comprising:

a first connector operable to connect to the memory device;

a second connector operable to connect to the ATA interface; and a controller operable to:

divide a memory capacity (in bytes) of the memory device by 512 to determine a quotient as a total number of sectors and prime factorize the total number of sectors to determine prime factors of the total number of sectors;

set a first variable, a second variable, and a third variable x to 1;

multiply the first variable by an xth smallest one of the prime factors to determine a first product;

update the first variable, if the first product is equal to or less than 16;

multiply the second variable by the xth smallest one of the prime factors to determine a second product, if the first product is greater than 16;

assign the second product as the second variable, if the second product is equal to or less than 255;

divide the total number of sectors by a product of the first variable and the second variable to determine a quotient;

update the second variable, if the quotient is greater than 65535, assign a quotient of the total number of sectors divided by a product of the first variable and the second variable as a number of cylinders, if the quotient is equal to or less than 65535;

assign the first variable and the second variable as a number of heads and a number of sectors per track, respectively; and assign a product of the number of heads, the number of sectors per track, and the number of cylinders as a total number of sectors for accessing the memory device in the CHS mode.

* * * * *